(12) United States Patent
Yamamoto

(10) Patent No.: US 9,162,710 B1  
(45) Date of Patent: Oct. 20, 2015

(54) VEHICLE REAR STRUCTURE

(71) Applicant: TOYOTA JIDOSHA KABUSHIKI KAISHA, Toyota-shi, Aichi-ken (JP)

(72) Inventor: Yohei Yamamoto, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/673,051

(22) Filed: Mar. 30, 2015

(30) Foreign Application Priority Data

Apr. 4, 2014 (JP) ................................. 2014-077779

(51) Int. Cl.
- *B62D 25/20* (2006.01)
- *B62D 25/16* (2006.01)
- *B62D 27/02* (2006.01)

(52) U.S. Cl.
CPC ............ *B62D 25/2027* (2013.01); *B62D 25/16* (2013.01); *B62D 27/02* (2013.01)

(58) Field of Classification Search
CPC ......... B62D 25/20; B62D 25/16; B62D 27/02
USPC ............... 296/203.04, 193.08, 193.02, 37.16, 296/203.03, 198, 195.05, 187.12, 29, 30
See application file for complete search history.

(56) References Cited

U.S. PATENT DOCUMENTS

| | | | |
|---|---|---|---|
| 6,196,622 B1* | 3/2001 | Brodt et al. | 296/203.04 |
| 7,083,225 B2* | 8/2006 | Yakata et al. | 296/203.04 |

FOREIGN PATENT DOCUMENTS

| | | |
|---|---|---|
| JP | 2003-312544 A | 11/2003 |
| JP | 2006-256351 A | 9/2006 |
| JP | 2009-023367 A | 2/2009 |

* cited by examiner

*Primary Examiner* — Joseph D Pape  
(74) *Attorney, Agent, or Firm* — Oliff PLC

(57) ABSTRACT

In a vehicle rear structure, flange portions disposed on an end portion of a front skeleton that extend in the vehicle width direction along a front edge of an upper back panel are joined to a joined flange portion between a wheel well outer member and a wheel well inner member of a rear wheel well. The joined flange portion is a region whose rigidity is high in a vehicle body side portion. Moreover, the flange portions of the front skeleton are joined to flange portions of the wheel well outer member and the wheel well inner member in a three-layer overlay. Because of this, the rigidity of the joint between the front skeleton and the vehicle body side portion is better than heretofore.

7 Claims, 11 Drawing Sheets

VEHICLE REAR STRUCTURE

CROSS-REFERENCE TO RELATED APPLICATION

This application is based on and claims priority under 35 USC 119 from Japanese Patent Application No. 2014-077779 filed on Apr. 4, 2014, which is incorporated by reference herein.

BACKGROUND

1. Technical Field

The present invention relates to a structure for the rear part of a vehicle and particularly relates to a structure in which an upper back front skeleton is disposed along a front edge of an upper back panel.

2. Related Art

In the vehicle body rear structure for a vehicle disclosed in Japanese Patent Application Laid-open (JP-A) No. 2009-23367 (patent document 1), a rear package tray (an upper back panel) is disposed between height direction middle portions of right and left side panels that configure right and left sides of a vehicle body. A cross member that extends in the vehicle width direction is disposed on the front edge of the rear package tray. The cross member has an upper cross member and a lower cross member that are joined to one another to form a closed cross section that extends in the vehicle width direction. Furthermore, the right and left ends of the rear package tray and the upper cross member are coupled to the right and left side panels via sheet-like joining members, and the right and left ends of the lower cross member are coupled to the right and left side panels via L-shaped members. Rear wheel wells having shapes that protrude inward in the vehicle width direction are formed under the right and left L-shaped members, and the upper portions of the rear wheel wells and the L-shaped members are coupled to one another by tower members.

In the vehicle body rear structure for a vehicle having the configuration described above, a skeleton (hereinafter called an upper back front skeleton) that has a closed cross-sectional shape and extends in the vehicle width direction is formed by the cross member, the right and left joining members, and the right and left L-shaped members. The upper back front skeleton forms the upper edge of an opening of a trunk pass-through that communicates the cabin and the trunk. Furthermore, retractors (seat belt take-up devices) that take up seat belts for restraining occupants seated in rear seats are housed inside the vehicle width direction ends of the upper back front skeleton—that is, inside the closed cross-sectional space formed by the joining members and the L-shaped members. A similar structure is disclosed in JP-A No. 2003-312544 (patent document 2).

The upper back front skeleton described above greatly contributes to the rigidity (particularly the torsional rigidity) of the vehicle body, so in order to improve the steering stability of the vehicle, it is necessary that the rigidity of the upper back front skeleton be well ensured. However, due to the relationship between the upper back front skeleton and members disposed near the upper back front skeleton and the relationship between the upper back front skeleton and the breadth of the trunk, there are cases where it is difficult to ensure a sufficient area for the closed cross section of the upper back front skeleton. Even in such cases, there is room for improvement in order to ensure the rigidity of the vehicle body.

SUMMARY

In view of the circumstances described above, it is an object of the present invention to obtain a vehicle rear structure that contributes to ensuring the rigidity of a vehicle body.

A vehicle rear structure pertaining to a first aspect of the present invention includes: a rear wheel well that is disposed in a vehicle body side portion of a vehicle rear portion and is formed as a result of a wheel well outer member and a wheel well inner member being joined to one another; and an upper back front skeleton that extends in the vehicle width direction along a front edge of an upper back panel, has a closed cross-sectional shape as seen from the vehicle width direction, configures part of a skeleton of the vehicle body, and whose vehicle width direction end is joined to a joined portion between the wheel well outer member and the wheel well inner member.

In the invention pertaining to the first aspect, the upper back front skeleton that extends in the vehicle width direction along the front edge of the upper back panel has a closed cross-sectional shape as seen from the vehicle width direction and configures the skeleton of the vehicle body. The vehicle width direction end of the upper back front skeleton is joined to the joined portion between the wheel well outer member and the wheel well inner member of the rear wheel well. The joined portion is a region whose rigidity is usually higher than that of the side panel described in the "Related Art" section. Moreover, the three members of the wheel well outer member, the wheel well inner member, and the upper back front skeleton are joined to one another, so the rigidity of the joint between the upper back front skeleton and the vehicle body side is improved compared to the structure described in the "Related Art" section. Because of this, the rigidity (particularly the torsional rigidity) of the vehicle body can be ensured even in a case where, for example, a sufficient area cannot be ensured for the closed cross section of the upper back front skeleton.

A vehicle rear structure pertaining to a second aspect is the first aspect, wherein the vehicle height dimension of the upper back front skeleton is set larger than the vehicle longitudinal dimension of the upper back front skeleton at least at the vehicle width direction end.

In the invention pertaining to the second aspect, the upper back front skeleton is formed as described above. For this reason, the difficulty with which the upper back front skeleton becomes deformed (which is quantified as a second moment of area) with respect to a longitudinal bending moment can be improved at least in the vehicle width direction end where deformation caused by torsion of the vehicle body is greater than on the vehicle width direction center side. As a result, the torsional rigidity of the vehicle body can be ensured further.

A vehicle rear structure pertaining to a third aspect is the first or second aspect, wherein the vehicle vertical dimension of the upper back front skeleton is set larger at the vehicle width direction end than at a vehicle width direction center side.

In the invention pertaining to the third aspect, the vehicle height dimension of the upper back front skeleton is set larger at the vehicle width direction end where deformation caused by torsion of the vehicle body is greater than on the vehicle width direction center side. Because of this, the torsional rigidity of the vehicle body can be ensured, and at the same time the space under the upper back front skeleton on the vehicle width direction center side can be enlarged.

A vehicle rear structure pertaining to a fourth aspect is any one of the first to third aspects, wherein the lower side of the vehicle longitudinal rear portion of the upper back front skeleton is recessed toward the vehicle front relative to the upper side at least at the vehicle width direction end.

In the invention pertaining to the fourth aspect, the upper back front skeleton is formed as described above, so even in a case where the vehicle height dimension of the upper back front skeleton is set large, the trunk can be enlarged toward the vehicle front by an amount corresponding to the recess. Because of this, a balance between ensuring the torsional rigidity of the vehicle described above and effective utilization of the trunk can be achieved.

A vehicle rear structure pertaining to a fifth aspect is any one of the first to fourth aspects, further including a reinforcement member that is disposed inside a closed cross-sectional space of a roof side rail, reinforces the roof side rail, extends toward the rear wheel well side, and is joined to the vehicle width direction end of the upper back front skeleton.

In the invention pertaining to the fifth aspect, the reinforcement member that reinforces the roof side rail extends toward the rear wheel well side and is joined to the rear wheel well and the vehicle width direction end of the upper back front skeleton. Because of this, the rigidity of the joint between the upper back front skeleton and the vehicle body side can be further improved, so an even greater contribution can be made to improving the rigidity of the vehicle body.

A vehicle rear structure pertaining to a sixth aspect is any one of the first to fifth aspects, further including a seat belt take-up device that is disposed on the vehicle rear side of the upper back front skeleton and on the vehicle front side of a trunk hinge.

In the invention pertaining to the sixth aspect, the seat belt take-up device is disposed on the vehicle rear side of the upper back front skeleton and on the vehicle front side of the trunk hinge. For this reason, the degree of freedom with which the vehicle rear portion including the upper back front skeleton is designed can be improved compared to a case where the seat belt take-up device is housed inside the upper back front skeleton.

A vehicle rear structure pertaining to an invention pertaining to a seventh aspect includes: a rear wheel well that is disposed in a vehicle body side portion of a vehicle rear portion; a reinforcement member that is disposed inside a closed cross-sectional space of the vehicle body side portion, reinforces the vehicle body side portion, and is joined to the rear wheel well; and an upper back front skeleton that extends in the vehicle width direction along a front edge of an upper back panel, has a closed cross-sectional shape as seen from the vehicle width direction, configures part of a skeleton of a vehicle body, and whose vehicle width direction end is joined to the reinforcement member.

In the invention pertaining to the seventh aspect, the upper back front skeleton that extends in the vehicle width direction along the front edge of the upper back panel has a closed cross-sectional shape as seen from the vehicle width direction and configures the skeleton of the vehicle body. The vehicle width direction end of the upper back front skeleton is joined to the reinforcement member disposed inside the closed cross-sectional space of the vehicle body side portion. The reinforcement member reinforces the vehicle body side portion and is joined to the rear wheel well whose rigidity is high. For this reason, because the vehicle width direction end of the upper back front skeleton is joined to the reinforcement member, the rigidity of the joint between the upper back front skeleton and the vehicle body side portion is improved compared to the structure described in the "Related Art" section. Because of this, the rigidity (particularly the torsional rigidity) of the vehicle body can be ensured even in a case where, for example, a sufficient area cannot be ensured for the closed cross section of the upper back front skeleton.

As described above, the vehicle rear structure pertaining to the present invention can contribute to ensuring the rigidity of a vehicle body.

BRIEF DESCRIPTION OF THE DRAWINGS

Exemplary embodiments of the present invention will be described in detail based on the following figures, wherein.

DETAILED DESCRIPTION OF THE INVENTION

First Embodiment

A vehicle rear structure 10 pertaining to a first embodiment of the present invention will be described on the basis of FIG. 1 to FIG. 10. Arrow FR, arrow UP, and arrow OUT appropriately shown in the drawings indicate a frontward direction (traveling direction) of the vehicle, an upward direction, and outward in the vehicle width direction, respectively. Hereinafter, unless otherwise specified, when description is given simply using the directions of front and rear, right and left, and up and down, these will mean front and rear in the vehicle longitudinal direction, right and left in the vehicle lateral direction (vehicle width direction), and up and down in the vehicle height direction.

(Configuration)

As shown in FIG. 1 to FIG. 5, the vehicle rear structure 10 pertaining to the present embodiment is an upper back structure of an automobile and is configured taking as its main components a rear wheel well 12 and an upper back front skeleton 14. The configuration of the environs including the rear wheel well 12 and the upper back front skeleton 14 will be described below. Because the vehicle rear structure 10 pertaining to the present embodiment is configured to be basically bilaterally symmetrical (symmetrical relative to the vehicle width direction center), FIG. 1 to FIG. 7 and FIG. 10 show only one side (the vehicle right side) in the vehicle width direction, and in the following description also, mainly one side in the vehicle width direction will be described.

The rear wheel well 12 houses a non-illustrated rear wheel and is disposed in right and left vehicle body side portions 11 of the vehicle rear portion. The rear wheel well 12 is equipped with a wheel well outer member 16, which configures the vehicle width direction outside section of the rear wheel well 12, and a wheel well inner member 18, which configures the vehicle width direction inside section of the rear wheel well 12. The wheel well outer member 16 and the wheel well inner member 18 are each formed as a result of sheet metal being press-formed. The wheel well outer member 16 and the wheel well inner member 18 are joined to one another by spot welding at flange portions 16A and 18B disposed on their respective peripheral edges. Because of this, the dome-shaped rear wheel well 12 is formed. The joint between the flange portion 16A and the flange portion 18A corresponds to a "joined portion". Hereinafter, this joined portion will be called a "joined flange portion 12A".

The front of the flange portion 16A of the wheel well outer member 16 extends further toward the vehicle upper side than the flange portion 18A of the wheel well inner member 18. A roof side inner member (a side panel) 20 is disposed on the vehicle upper side of the flange portion 16A. The roof side inner member 20 is formed in a sheet as a result of sheet metal whose sheet thickness is thinner than that of the sheet metal of the wheel well outer member 16 and the wheel well inner member 18 being press-formed. The roof side inner member 20 is disposed with its sheet thickness direction coinciding with the vehicle width direction and configures the vehicle width direction inside section of a C pillar 22 of the vehicle body. The lower end of the roof side inner member 20 is joined by spot welding to the upper end of the flange portion 16A.

A roof side inner rear member 24 (only illustrated in FIG. 1, FIG. 2, and FIG. 10) is disposed on the vehicle rear side of the roof side inner member 20. The roof side inner rear member 24 is formed in a sheet as a result of sheet metal having the same sheet thickness as that of the sheet metal of the roof side inner member 20 being press-formed and is disposed with its sheet thickness direction coinciding with the vehicle width direction. The front end of the roof side inner rear member 24 is joined by spot welding to the rear end of the roof side inner member 20 and the rear end of the joined flange portion 12A (the flange portions 16A and 18A).

Figure 4:
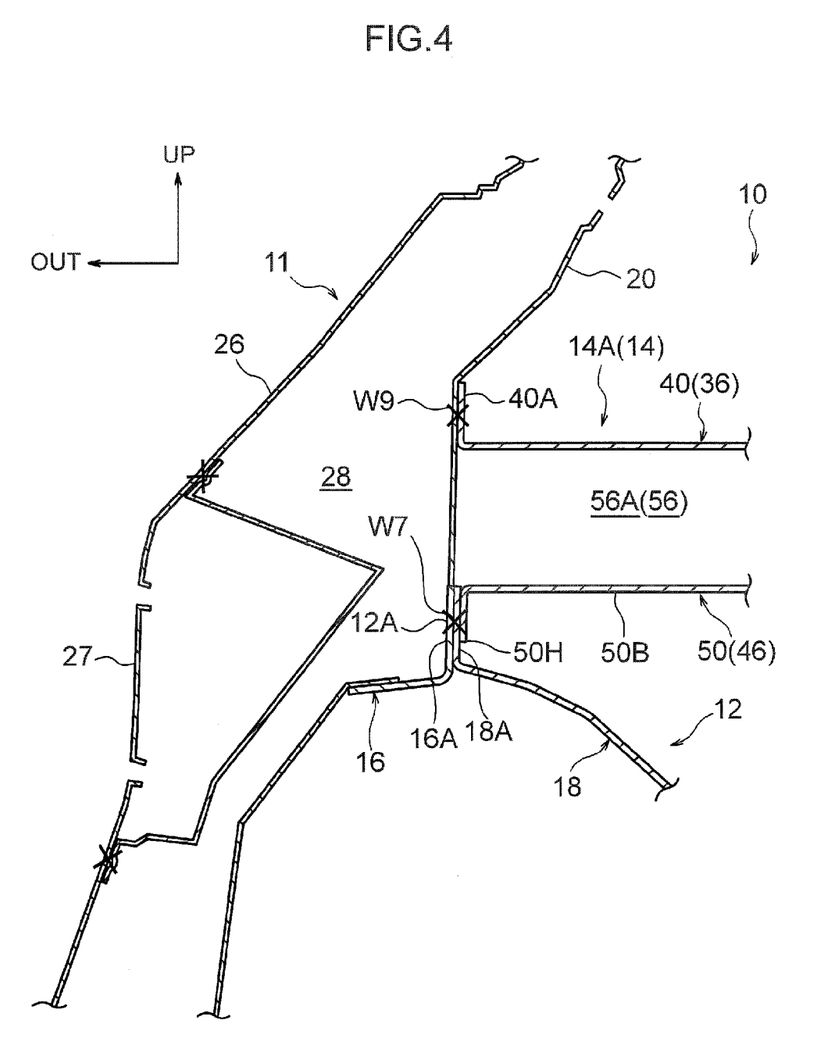
FIG. 4 is a cross-sectional view showing a cross section along line F4-F4 of FIG. 1.
Figure 5:
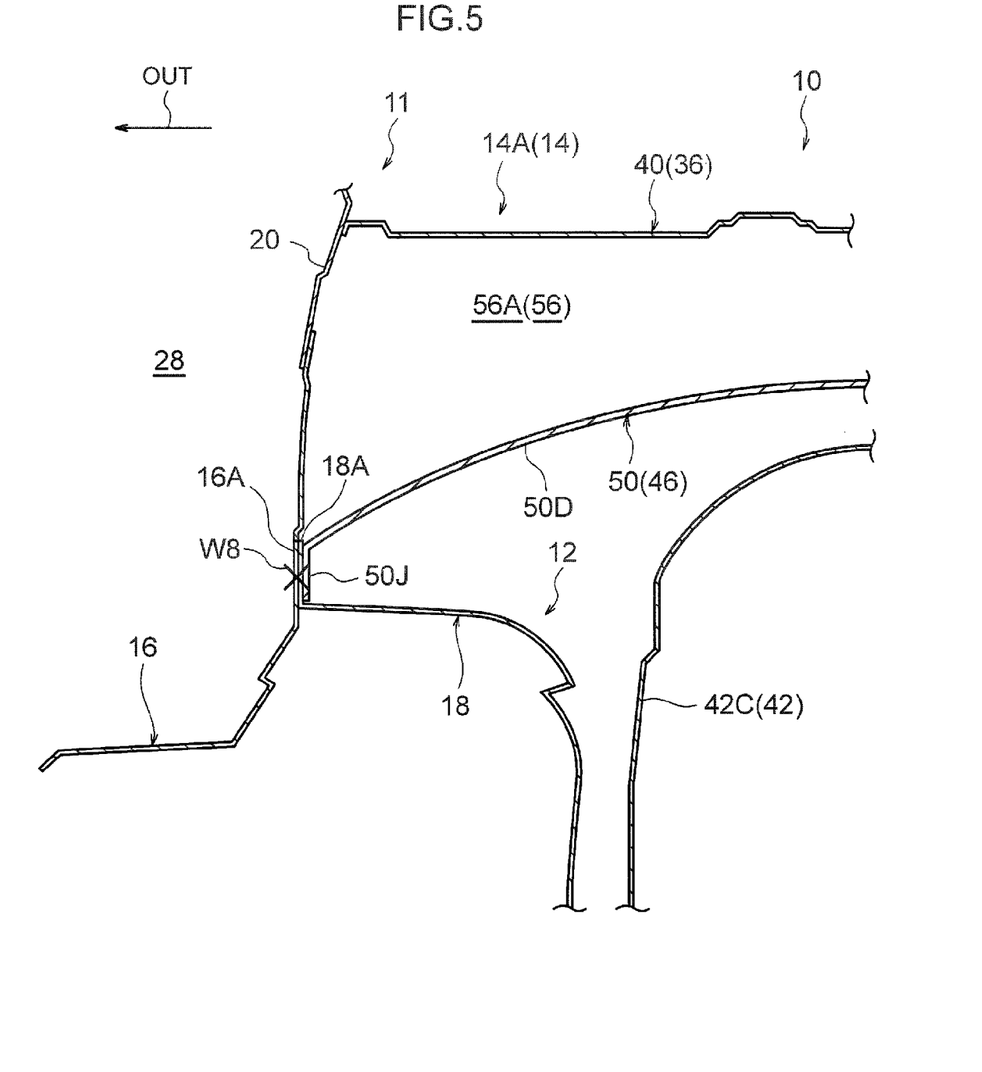
FIG. 5 is a cross-sectional view showing a cross section along line F5-F5 of FIG. 1.
Figure 6:
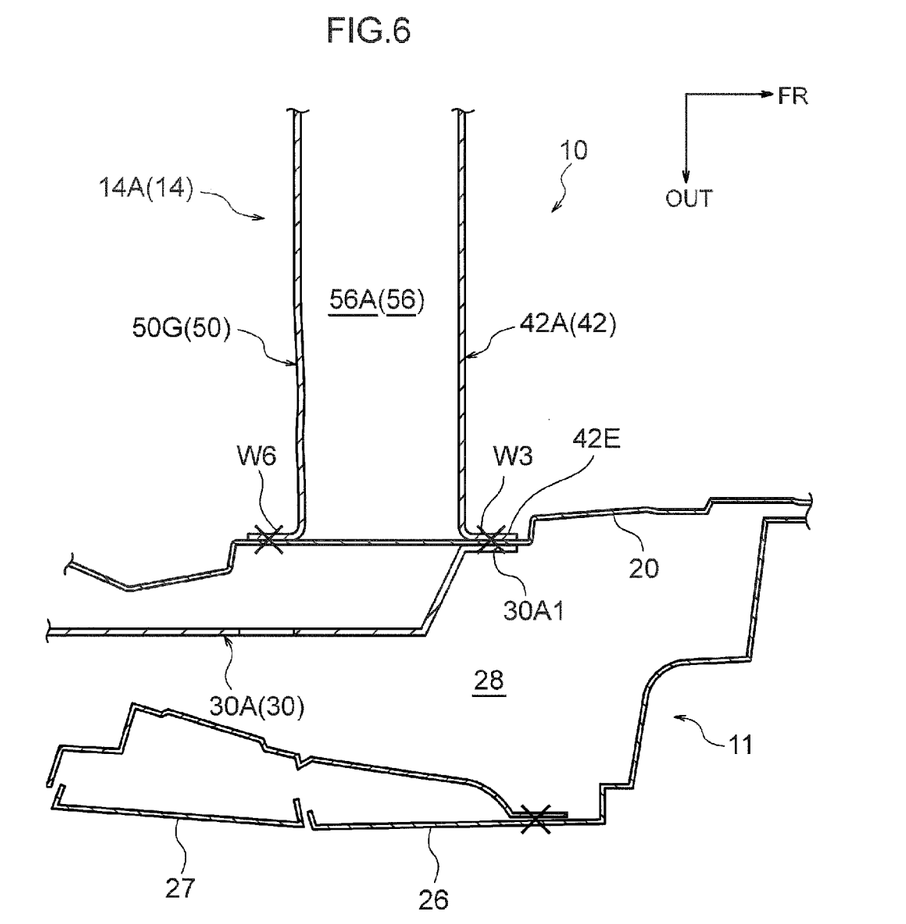
FIG. 6 is a cross-sectional view showing a cross section along line F6-F6 of FIG. 1.
Figure 7:
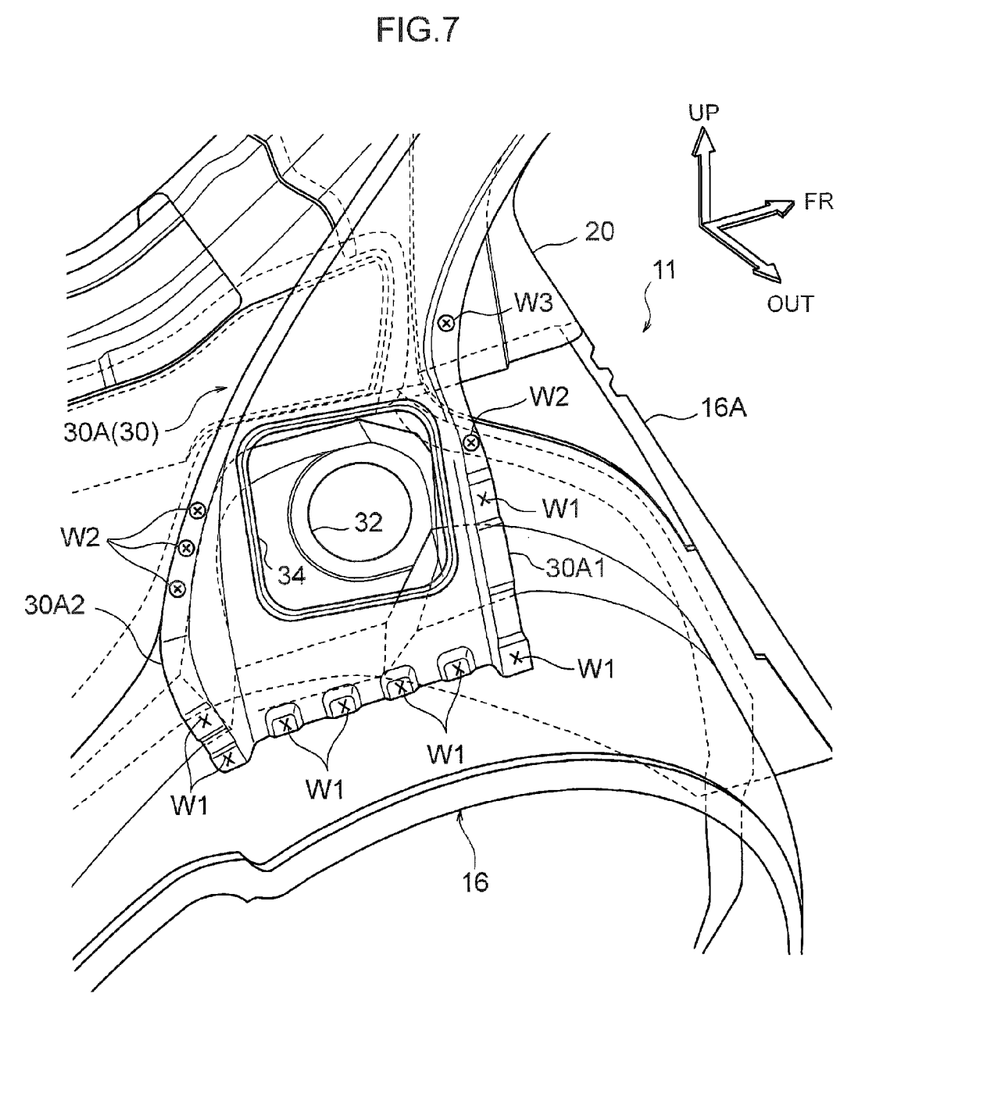
FIG. 7 is a perspective view showing the configuration of the environs of a joined portion between a roof side outer reinforcement and a rear wheel well that are constituent members of the vehicle rear structure.

A side outer panel 26 (only illustrated in FIG. 4 and FIG. 6; hereinafter called "the side outer member 26") that configures the exterior design of the vehicle is disposed on the vehicle width direction outside of the roof side inner member 20 and the roof side inner rear member 24. In FIG. 4 and FIG. 6, the member to which reference sign 27 is assigned is a fuel lid. The side outer member 26 forms a closed cross-sectional space 28 in the vehicle body side portion 11 together with the roof side inner member 20. The closed cross-sectional space 28 is continuous with a closed cross-sectional space of a non-illustrated roof side rail. A roof side outer reinforcement 30 (hereinafter called "the roof side outer member R/F 30") shown in FIG. 6 and FIG. 7 is disposed inside the closed cross-sectional space 28. The aforementioned roof side rail is a member that extends in the vehicle longitudinal direction along the side of a roof (not illustrated in the drawings) of the vehicle body and configures a skeleton of the vehicle body, and the roof side rail couples, in the vehicle longitudinal direction, the upper end of the C pillar 22 to upper ends of an A pillar and a B pillar (neither of which are illustrated in the drawings) of the vehicle body.

The roof side outer member R/F 30 is a reinforcement member that is disposed inside the closed cross-sectional space of the roof side rail, which is part of the vehicle body side portion 11, and reinforces the roof side rail, and the roof side outer member R/F 30 bridges the upper ends of the A pillar, the B pillar, and the C pillar 22. The cross-sectional shape of the roof side outer member R/F 30 as seen from the vehicle front and rear direction (the lengthwise direction) is formed in a hat shape, for example, and the roof side outer member R/F 30 has a ridgeline that extends in its lengthwise direction. As shown in FIG. 6 and FIG. 7, an extended portion 30A that extends toward the rear wheel well 12 side is disposed on the rear portion of the roof side outer member R/F 30. The extended portion 30A is joined to the rear wheel well 12.

Specifically, flange portions 30A1 and 30A2 are disposed on both the front and rear ends of the extended portion 30A, and the flange portions 30A1 and 30A2 and the lower end of the extended portion 30A are joined by spot welding to the wheel well outer member 16 in a two-layer overlay state (see welding points W1 in FIG. 7). Furthermore, the flange portions 30A1 and 30A2 of the extended portion 30A are joined by spot welding to the joined flange portion 12A—that is, the flange portions 16A and 18A—in a three-layer overlay (see welding points W2 in FIG. 7). Moreover, the front side flange portion 30A1 of the extended portion 30A is joined by spot welding to the roof side inner member 20 and a flange portion 42E of a strainer 42 described later in a three-layer overlay (see welding point W3 in FIG. 7). As shown in FIG. 7, an opening 34 for exposing a fuel pipe insertion opening 32 formed in the wheel well outer member 16 is formed in the extended portion 30A.

Figure 1:
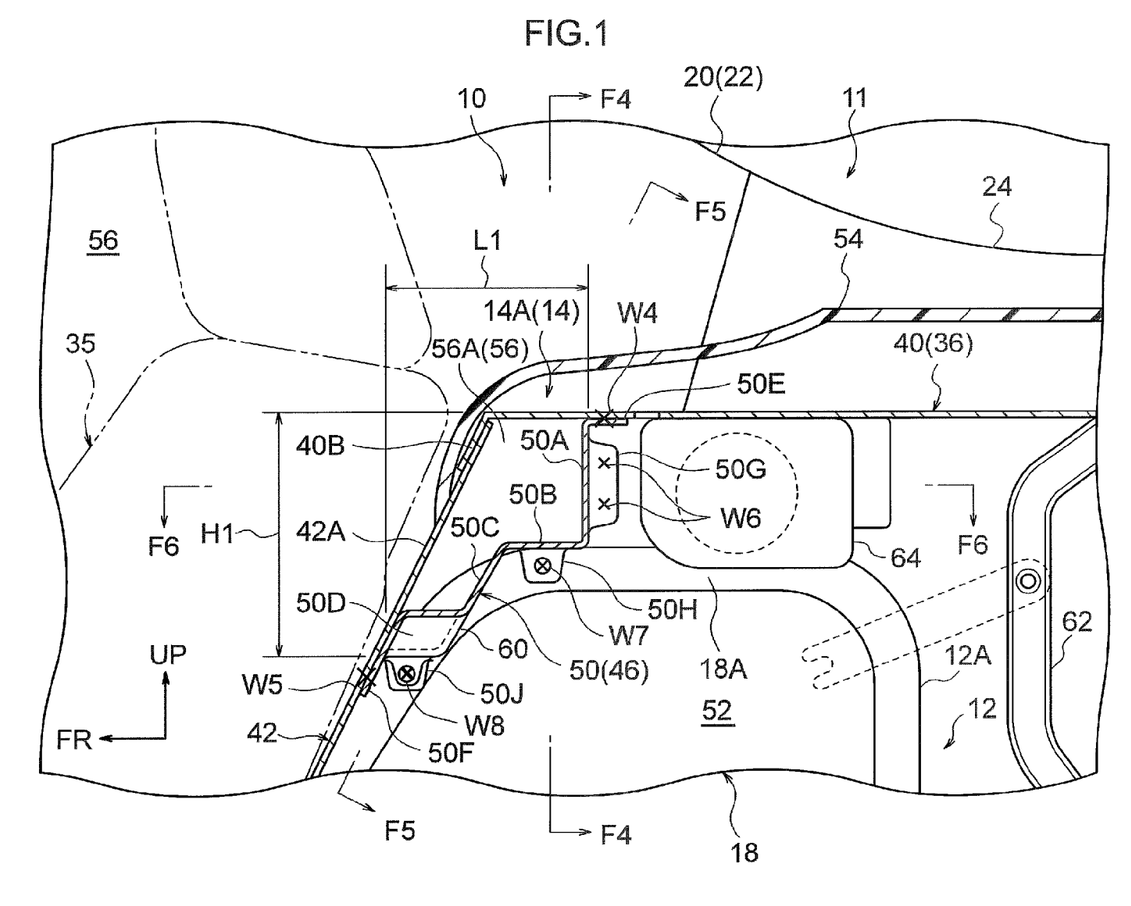
FIG. 1 is a longitudinal cross-sectional view showing a partial configuration of a vehicle rear structure pertaining to a first embodiment of the present invention as seen from inward in a vehicle width direction, and corresponds to a cross section along line F1-F1 of FIG. 2.
Figure 2:
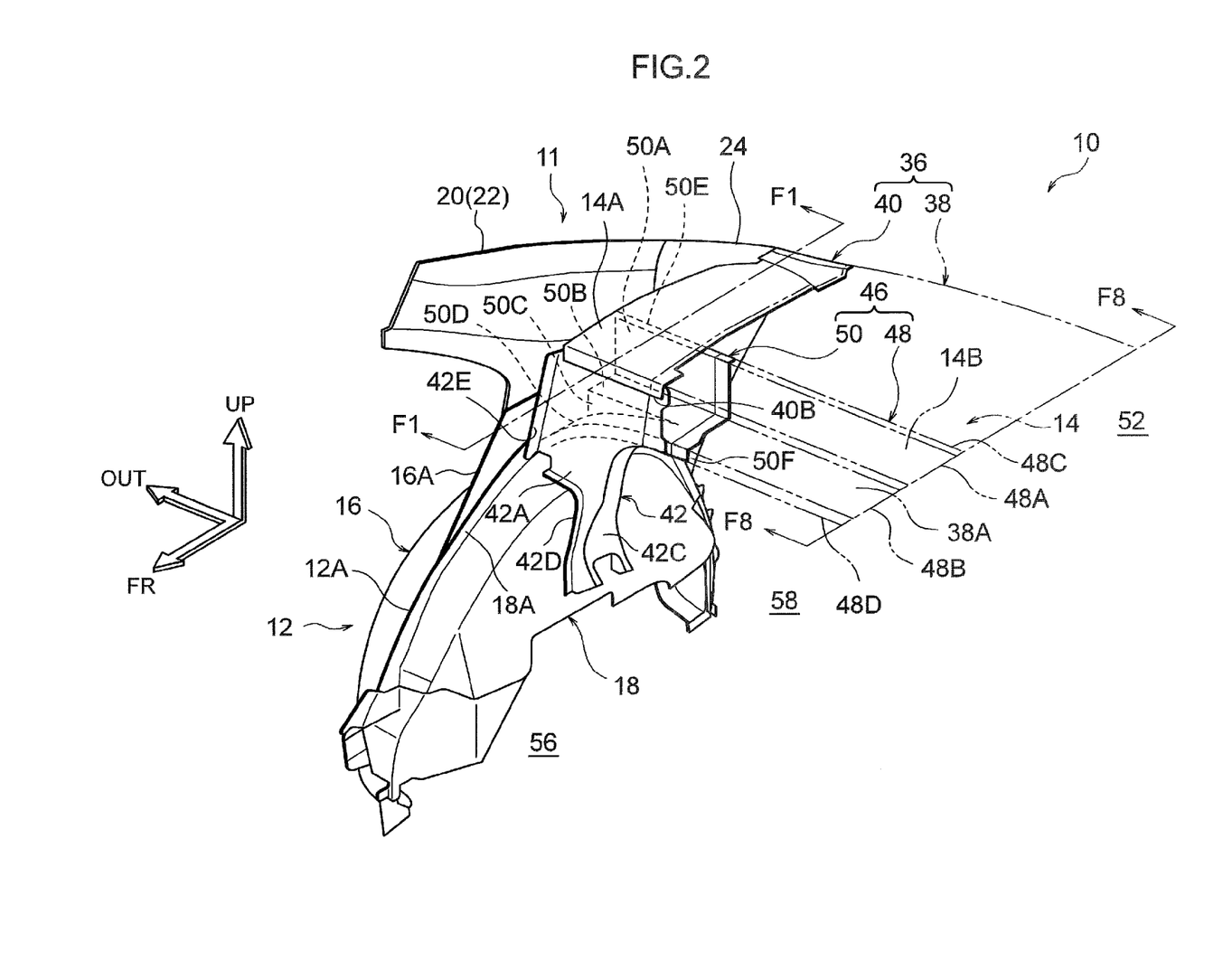
FIG. 2 is a perspective view showing the partial configuration of the vehicle rear structure.
Figure 10:
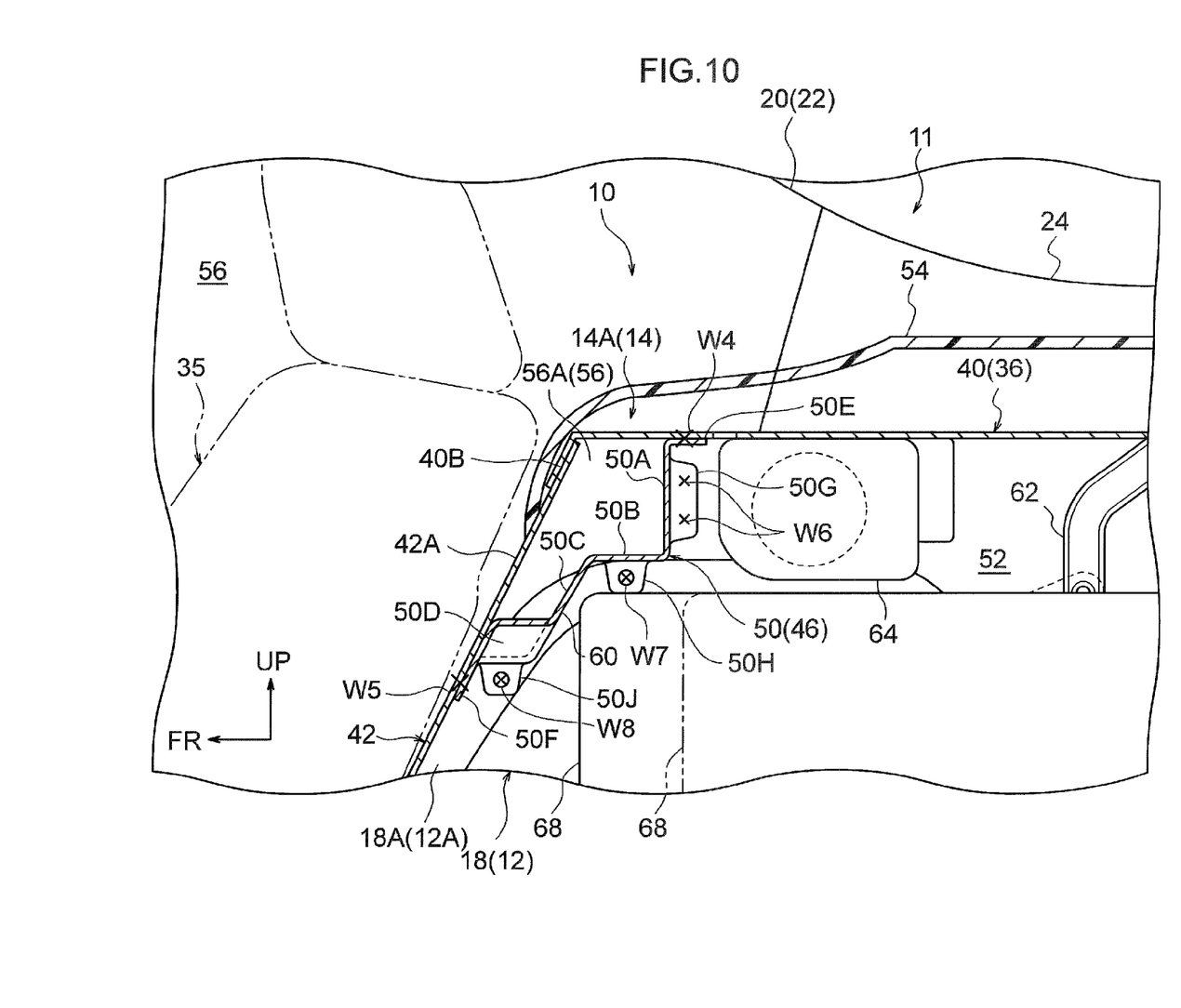
FIG. 10 is a cross-sectional view corresponding to FIG. 1 showing a state in which a piece of luggage has been placed in a trunk of the vehicle rear structure.

As shown in FIG. 1 and FIG. 2, the upper back front skeleton 14 (hereinafter called "the front skeleton 14") extends in the vehicle width direction along a front edge of an upper back panel 36 and is disposed neighboring the vehicle rear side of an upper end of a rear seat 35 (only illustrated in FIG. 1 and FIG. 10). The front skeleton 14 is formed by the upper back panel 36, a strainer 42, and an upper back reinforcement 46 (hereinafter called "the upper back R/F 46"), has a closed cross-sectional shape as seen from the vehicle width direction, and configures part (a cross member) of the skeleton of the vehicle body. The front skeleton 14 will be described in detail below.

Figure 3:
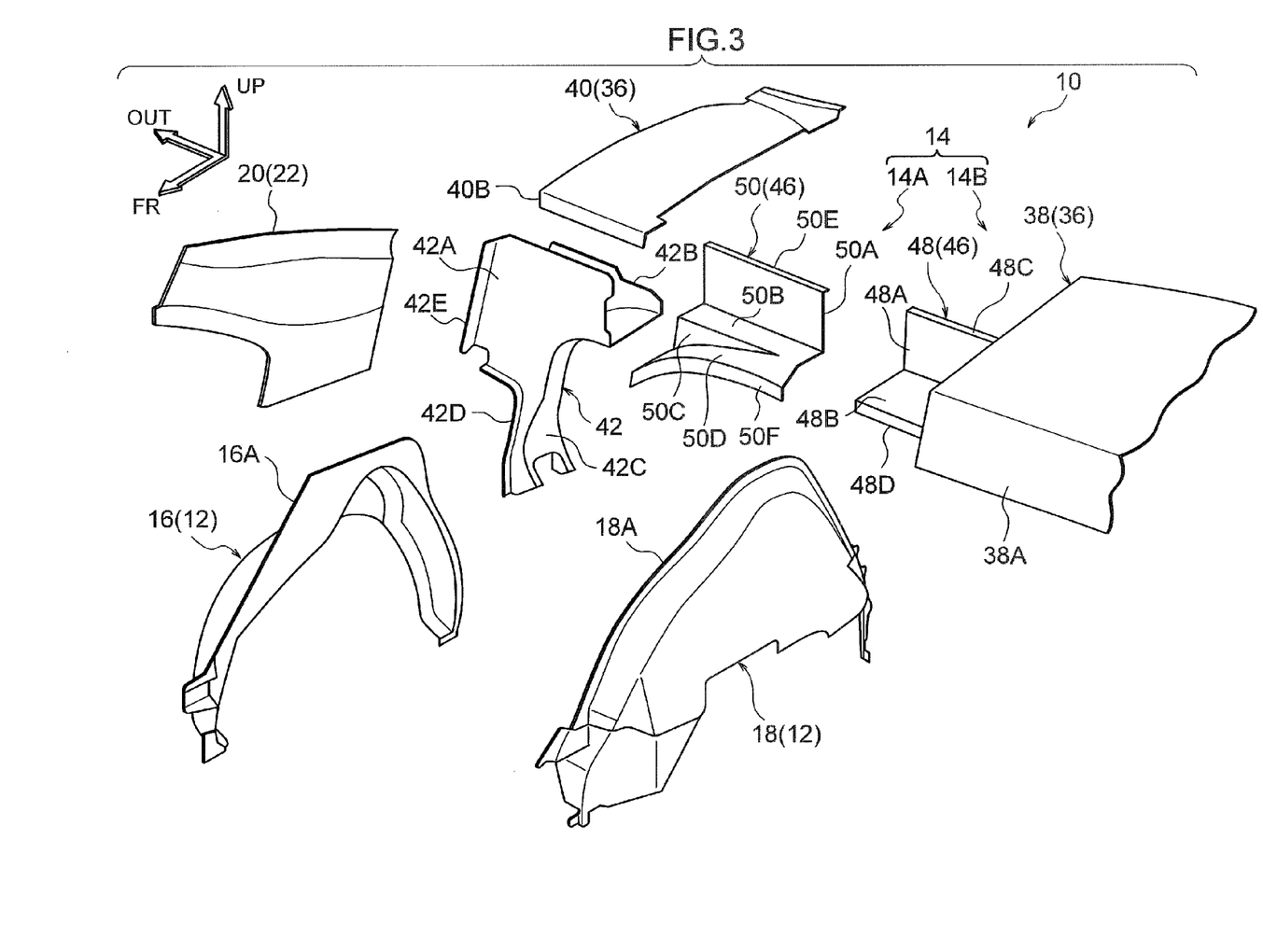
FIG. 3 is an exploded perspective view showing in exploded form the configuration shown in FIG. 2.

As shown in FIG. 2 and FIG. 3, the upper back panel 36 is configured by an upper back panel center portion 38 (hereinafter called "the panel center portion 38"), which is disposed on the vehicle width direction center, and an upper back panel side portion 40 (hereinafter called "the panel side portion 40"), which is disposed continuously with both vehicle width direction sides of the panel center portion 38.

The panel center portion 38 is formed in a sheet as a result of sheet metal being press-formed and is disposed with its sheet thickness direction coinciding with the vehicle height direction. The panel center portion 38 is a main body of the upper back panel 36 and forms an upper wall (ceiling wall) of a trunk 52. The panel center portion 38 is formed in a long shape whose lengthwise direction coincides with the vehicle width direction and extends in the vehicle width direction straddling the vehicle width direction center of the vehicle body. A front wall 38A that extends toward the vehicle lower side is disposed on the front end of the panel center portion 38.

The panel side portion 40 is formed in a sheet as a result of sheet metal being press-formed and is disposed with its sheet thickness direction coinciding with the vehicle height direction. The panel side portion 40 is a package tray and is disposed between the panel center portion 38 and the roof side inner member 20 and roof side inner rear member 24. The panel side portion 40 is formed in a long shape whose lengthwise direction coincides with the vehicle longitudinal direction and forms a continuous surface with the panel center portion 38.

The vehicle width direction inside end of the panel side portion 40 is joined by spot welding to the vehicle width direction outside end of the upper back panel 36 in a state in which they are overlaid on top of one another in the vehicle height direction. Furthermore, a flange portion 40A (only illustrated in FIG. 4) disposed on the vehicle width direction outside end of the panel side portion 40 is joined by spot welding to the vehicle width direction inside surfaces of the roof side inner member 20 and the roof side inner rear member 24. Furthermore, a flange portion 40B that extends toward the vehicle lower side is disposed on the front end of the panel side portion 40. As shown in FIG. 1, a package tray trim 54 made of resin is disposed on the vehicle upper side of the panel side portion 40.

As shown in FIG. 2 and FIG. 3, the strainer 42 is disposed between the front end of the panel side portion 40 and the wheel well inner member 18. The strainer 42 has a front wall 42A that is disposed continuously in the vehicle width direction with the front wall 38A of the panel center portion 38, a rear wall 42B (only illustrated in FIG. 3) that opposes the front wall 42A from the vehicle rear side, and a side wall 42C that couples the vehicle width direction inside ends of the front wall 42A and the rear wall 42B to one another in the vehicle longitudinal direction.

The strainer 42 also has flange portions 42D that are disposed on the lower sides of the front wall 42A and the rear wall 42B, and the flange portions 42D are joined by spot welding to the upper surface and the vehicle width direction inside surface of the wheel well inner member 18. Furthermore, the strainer 42 also has flange portions 42E that are disposed on the vehicle width direction outside ends of the upper sides of the front wall 42A and the rear wall 42B, and the flange portions 42E are joined by spot welding to the flange portion 16A of the wheel well outer member 16 and the roof side inner member 20. Furthermore, the flange portion 40B of the panel side portion 40 is joined by spot welding to the upper end of the front wall 42A of the strainer 42. Moreover, the upper end of the rear wall 42B of the strainer 40 is joined by spot welding to a rear wall 50A of an upper back reinforcement side portion 50 described later.

The upper back R/F 46 is configured by an upper back reinforcement center portion 48 (hereinafter called "the R/F center portion 48"), which extends in the vehicle width direction along the front edge of the panel center portion 38, and an upper back reinforcement side portion 50 (hereinafter called "the R/F side portion 50"), which is disposed continuous with both vehicle width direction sides of the R/F center portion 48 and extends in the vehicle width direction along the front edge of the panel side portion 40.

The R/F side portion 50 is disposed on the vehicle lower side of the front end of the panel side portion 40 and between the front wall 42A and the rear wall 42B of the strainer 42. The R/F side portion 50 is equipped with a rear wall 50A, which opposes the front wall 42A of the strainer 42 from the vehicle rear side, and a lower wall rear portion 50B, which extends toward the vehicle front side from the lower end of the rear wall 50A. An inclined wall 50C extends obliquely downward toward the vehicle front side from the front end of the lower wall rear portion 50B, and a lower wall front portion 50D extends toward the vehicle front side from the lower end of the inclined wall 50C.

However, the inclined wall 50C is formed in such a way that its height dimension becomes smaller (gradually decreases) heading inward in the vehicle width direction, and the inclined wall 50C does not exist on the vehicle width direction inside end of the R/F side portion 50. In other words, at the vehicle width direction inside end of the R/F side portion 50, the lower wall rear portion 50B and the lower wall front portion 50D form a continuous surface in the vehicle longitudinal direction, and the lower wall front portion 50D curves downward toward the vehicle lower side relative to the lower wall rear portion 50B heading outward in the vehicle width direction. For this reason, the height dimension of the front side of the R/F side portion 50 becomes larger (increases: gradually increases) heading outward in the vehicle width direction.

As shown in FIG. 1, the R/F side portion 50 also has a flange portion 50E that extends toward the vehicle rear side from the upper end of the rear wall 50A, and the flange portion 50E is joined by spot welding to the undersurface of the panel side portion 40 (see welding point W4 in FIG. 1). Furthermore, the R/F side portion 50 also has a flange portion 50F that extends obliquely downward toward the vehicle front side from the front end of the lower wall front portion 50D, and the flange portion 50F is joined to the rear surface of the front wall 42A of the strainer 42 (see welding point W5 in FIG. 1). Because of this, as shown in FIG. 1, a closed cross-sectional space 56A is formed by the strainer 42, the panel side portion 40, and the R/F side portion 50. The closed cross-sectional space 56A is formed in such a way that its vehicle width direction inside end has a trapezoidal shape as seen from the vehicle width direction, but heading outward in the vehicle width direction the shape of the closed cross-sectional space 56A as seen from the vehicle width direction gradually changes to a generally inverted L-shape.

Moreover, the R/F side portion 50 also has a flange portion 50G that extends toward the vehicle rear side from the vehicle width direction outside end of the rear wall 50A, and the flange portion 50G is joined by spot welding to the roof side inner member 20 (see welding points W6 in FIG. 1). Furthermore, the R/F side portion 50 also has a flange portion 50H, which extends toward the vehicle lower side from the vehicle width direction outside end of the lower wall rear portion 50B, and a flange portion 50J, which extends toward the vehicle lower side from the vehicle width direction outside end of the lower wall front portion 50D. The flange portions 50H and 50J are joined by spot welding to the joined flange portion 12A (the flange portions 16A and 18A) of the rear wheel well 12 (see welding points W7 and W8 in FIG. 1).

The R/F center portion 48 is disposed on the vehicle lower side of the panel center portion 38 and on the vehicle rear side of the front wall 38A and bridges the right and left R/F side portions 50. The R/F center portion 48 is formed in a shape that is continuous with the vehicle width direction inside end of the R/F side portion 50. Specifically, the R/F center portion 48 has a rear wall 48A that opposes the front wall 38A of the panel center portion 38 from the vehicle rear side and is continuous with the rear wall 50A of the R/F side portion 50. A lower wall 48B extends toward the vehicle front side from the lower end of the rear wall 48A. The lower wall 48B is continuous with the vehicle width direction inside ends of the lower wall rear portion 50B and the lower wall front portion 50D of the R/F side portion 50.

Figure 8:
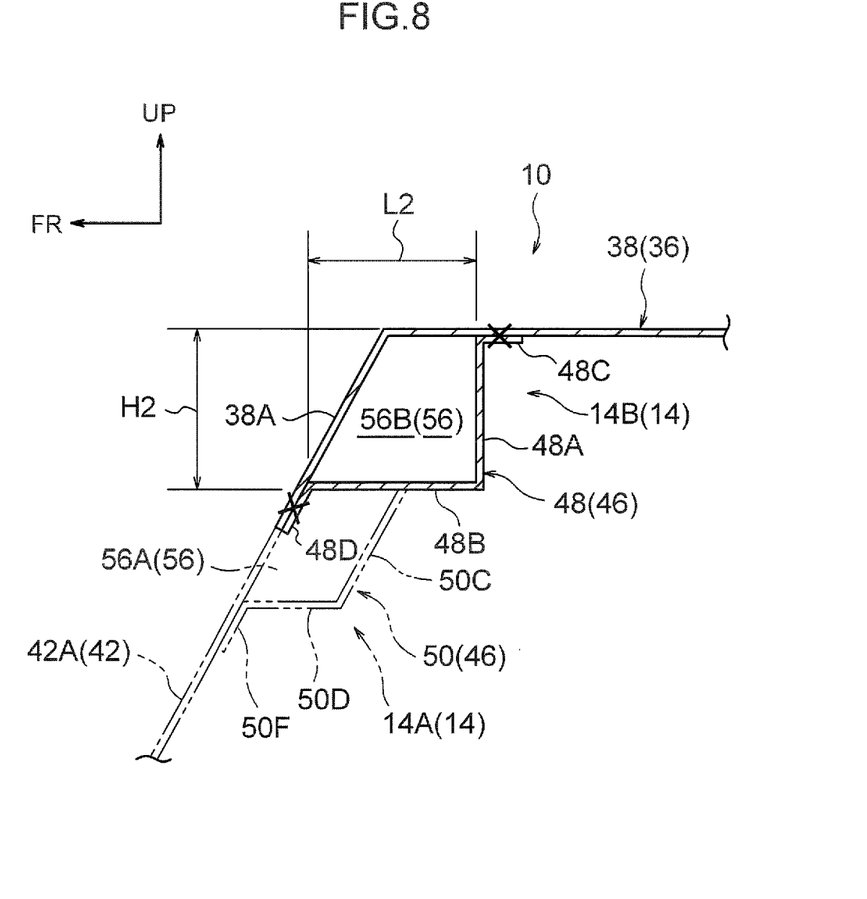
FIG. 8 is a cross-sectional view showing a cross section along line F8-F8 of FIG. 2.

The vehicle width direction outside end of the R/F center portion 48 is joined by spot welding to the vehicle width direction inside end of the R/F side portion 50 in a state in which they are overlaid on top of one another in the vehicle height direction. Furthermore, the R/F center portion 48 also has a flange portion 48C, which is disposed on the rear end of the rear wall 48A, and a flange portion 48D, which is disposed on the front end of the lower wall 48B. The flange portion 48C is joined by spot welding to the undersurface of the panel center portion 38, and the flange portion 48D is joined to the rear surface of the lower end of the front wall 38A. Because of this, as shown in FIG. 8, a closed cross-sectional space 56B is formed by the upper back panel 36 and the R/F center portion 48. The closed cross-sectional space 56B is formed in a trapezoidal shape as seen from the vehicle width direction, and the cross-sectional shape and dimension of the closed cross-sectional space 56B are set to be constant or substantially constant across the entire length of the closed cross-sectional space 56B in the vehicle width direction.

In the front skeleton 14 having the configuration described above, the closed cross-sectional space 56A formed by the strainer 42, the panel side portion 40, and the R/F side portion 50 and the closed cross-sectional space 56B formed by the upper back panel 36 and the R/F center portion 48 are continuous with one another in the vehicle width direction. Because of this, a closed cross-sectional space 56 that extends in the vehicle width direction is formed between the right and left vehicle body side portions 11. The front skeleton 14 configures an upper edge of an opening 58 of a trunk pass-through that communicates the trunk 52 and a cabin 56. When "the closed cross section of the front skeleton 14" appears in the following description, this will mean the closed cross section of the front skeleton 14 as seen from the vehicle width direction.

Both vehicle width direction end portions 14A of the front skeleton 14 are joined to the vehicle body side portions 11 at the flange portion 42E of the front wall 42A of the strainer 42 (see FIG. 2 and FIG. 3), the flange portion 40A of the panel side portion 40 (see FIG. 4), and the flange portions 50G, 50H, and 50J of the R/F side portion 50 (see FIG. 1). Specifically, the upper side of the flange portion 42E of the front wall 42A of the strainer 42 is joined by spot welding to the roof side inner member 20 in a two-layer overlay state, and the lower side of the flange portion 42E of the front wall 42A of the strainer 42 is joined to the flange portion 16A of the wheel well outer member 16 in a two-layer overlay state. However, part of the flange portion 42E is joined by spot welding to the roof side outer member R/F 30 and the roof side inner member 20 in a three-layer overlay (see welding point W3 in FIG. 6).

Furthermore, the flange portion 40A of the panel side portion 40 is joined by spot welding to the roof side inner member 20 in a two-layer overlay state (see welding point W9 in FIG. 4). Likewise, the flange portion 50G of the R/F side portion 50 is joined by spot welding to the roof side inner member 20 in a two-layer overlay state (see welding points W6 in FIG. 1 and FIG. 6). The flange portions 50H and 50J of the R/F side portion 50 are joined by spot welding to the joined flange portion 12A—that is, the flange portions 16A and 18A—of the rear wheel well 12 in a three-layer overlay (see welding points W7 and W8 in FIG. 1, welding point W7 in FIG. 4, and welding point W8 in FIG. 5). Because of this, the front skeleton 14 bridges the right and left vehicle body side portions 11 (the right and left rear wheel wells 12). The welding point positions and the number of welding points appropriately illustrated in the drawings are only examples.

In other words, in the present embodiment, by changing the shape of the R/F side portion 50 (the upper back R/F 46), the front skeleton 14 is joined to the joined flange portion 12A of the rear wheel well 12 whose rigidity is high in the vehicle body side portion 11.

As mentioned above, the front skeleton 14 is formed in such a way that the height dimension of the front side of the R/F side portion 50 becomes larger heading outward in the vehicle width direction. For this reason, a vehicle front and rear direction dimension L1 (see FIG. 1) of the vehicle width direction end portion 14A (hereinafter called "the end portion 14A") of the front skeleton 14 is set larger than a vehicle front and rear direction dimension L2 (see FIG. 8) of a vehicle width direction middle portion 14B (hereinafter called "the middle portion 14B") on the vehicle width direction center side of the front skeleton 14. In the present embodiment, the middle portion 14B is the region of the front skeleton 14 between the right and left strainers 42.

Furthermore, a vehicle height dimension H1 of the end portion 14A of the front skeleton 14 is set larger than the vehicle longitudinal direction dimension L1 of the end portion 14A as a result of the cross section of the end portion 14A being enlarged in the vehicle height direction so as to follow the shape of the wheel well inner member 18. In the present embodiment, a vehicle height direction dimension H2 of the middle portion 14B of the front skeleton 14 is set slightly smaller than the vehicle longitudinal dimension L2 of the middle portion 14B. Because of this, a large vehicle height dimension is ensured for the opening 58 of the trunk pass-through.

Moreover, as shown in FIG. 1, a recessed portion 60 is formed on the lower side of the rear portion of the end portion 14A of the front skeleton 14, so that the lower side of the rear portion of the end portion 14A is recessed toward the vehicle front side relative to the upper side. The upper surface of the recessed portion (recess) 60 is configured by the lower wall rear portion 50B of the R/F side portion 50. The height of the upper surface of the recessed portion 60 is set to the same height as the upper end of the flange portion 18A of the wheel well inner member 18.

Furthermore, as shown in FIG. 1, a retractor 64 is disposed on the vehicle rear side of the end portion 14A of the front skeleton 14 and on the vehicle front side of a trunk hinge 62. The retractor 64 is a seat belt take-up device for taking up and storing a non-illustrated seat belt for restraining an occupant seated in the rear seat 35, and the retractor 64 is fastened and secured to the panel side portion 40 by non-illustrated bolts and nuts. The retractor 64 has a built-in mechanism (a so-called pretensioner) that improves the occupant restraining force of the seat belt by forcibly taking up the seat belt when, for example, the vehicle suddenly decelerates. For this reason, the retractor 64 is configured to be larger in size than a retractor that does not have a built-in pretensioner, and so the retractor 64 is incapable of being disposed inside the closed cross-sectional space 56 of the front skeleton 14.

The vehicle height dimension of the retractor 64 is set smaller than the vehicle longitudinal dimension of the retractor 64, and the height of the upper surface of the aforementioned recessed portion 60 is set the same as (here, slightly on the upper side of) the height of the undersurface of the retractor 64. The trunk hinge 62 is a hinge for rotatably coupling a non-illustrated trunk lid for opening and closing the trunk 52 to the vehicle body and is disposed on both the right and left sides of the vehicle rear portion.

(Mechanism)

Next, the mechanism of the first embodiment will be described.

In the vehicle rear structure 10 having the configuration described above, the front skeleton 14 that extends in the vehicle width direction along the front edge of the upper back panel 36 has a closed cross-sectional shape as seen from the vehicle width direction and configures the skeleton of the vehicle body. The flange portions 50H and 50J disposed on the end portion 14A of the front skeleton 14 are joined to the joined flange portion 12A (the flange portions 16A and 18A) between the wheel well outer member 16 and the wheel well inner member 18 of the rear wheel well 12.

The joined flange portion 12A is a region whose rigidity is sufficiently higher than that of the roof side inner member 20 (which corresponds to the side panel described in the "Related Art" section) in the vehicle body side portion 11. Moreover, the flange portions 50H and 50J of the front skeleton 14 are joined to the flange portions 16A and 18A of the wheel well outer member 16 and the wheel well inner member 18 in a three-layer overlay. Because of this, the rigidity of the joint between the front skeleton 14 and the vehicle body side portion 11 is improved compared to the conventional structure in which the end portion 14A of the front skeleton 14 is joined in a two-layer overlay state to the roof side inner member 20. As a result, the rigidity (particularly the torsional rigidity) of the vehicle body can be ensured even in a case where, for example, a sufficient area cannot be ensured for the closed cross section of the front skeleton 14.

In other words, the positions of the front surface, the undersurface, and the upper surface of the end portion 14A of the front skeleton 14 are decided by the positions of the rear seat 35, the flange portion 18A of the wheel well inner member 18, and the package tray trim 54 that is associated with the rear view of the driver. Furthermore, in a case where the large-size retractor 64 that is incapable of being disposed inside the closed cross-sectional space 56 of the front skeleton 14 is disposed on the vehicle rear side of the front skeleton 14 and on the vehicle front side of the trunk hinge 62 like in the present embodiment, the position of the rear surface of the end portion 14A of the front skeleton 14 is decided by the position of the retractor 64. For this reason, in order to ensure the same breadth as heretofore for the trunk 52, which is narrowed by the spaces in which the retractors 64 are disposed, it becomes necessary to shrink the area of the closed cross section of the front skeleton 14.

In this regard, in the present embodiment, the rigidity of the joint between the front skeleton 14 and the vehicle body side portion 11 can be improved as described above, so even in a case where the area of the closed cross section of the front skeleton 14 has been shrunken, a drop in the vehicle body rigidity caused by that shrinkage can be avoided. Because of this, the steering stability of the vehicle can be improved. In other words, in a case where the same area as heretofore can be ensured for the area of the closed cross section of the front skeleton 14, it is possible to effectively improve the vehicle body rigidity, and the steering stability of the vehicle can be improved. Moreover, the vehicle rear structure 10 has a configuration that sets and changes the position at which the front skeleton 14 is joined to the vehicle body side portion 11, so the weight and cost of the vehicle can be reduced compared to a configuration where a new reinforcement member is added in order to ensure or improve the vehicle body rigidity.

Moreover, the vehicle height dimension H1 of the end portion 14A of the front skeleton 14 is set larger than the vehicle longitudinal dimension L1 of the end portion 14A as a result of the cross section of the end portion 14A being enlarged in the vehicle height direction so as to follow the shape of the wheel well inner member 18. For this reason, the difficulty with which the front skeleton 14 becomes deformed (second moment of area) with respect to a longitudinal bending moment can be improved at least in the end portion 14A where deformation caused by torsion of the vehicle body is greater than in the middle portion 14B. As a result, the Kt value, which is a value indicating the torsional rigidity of the vehicle body, can be improved, so the torsional rigidity of the vehicle body can be ensured or improved further, and the steering stability of the vehicle can be ensured further. In this way, in the present embodiment, with respect to the trend to shrink the closed cross section of the front skeleton 14, the rigidity of the vehicle body can be improved by means of the cross-sectional shape of the front skeleton 14 and the structure by which the front skeleton 14 is joined to the vehicle body side portion 11.

Figure 9:
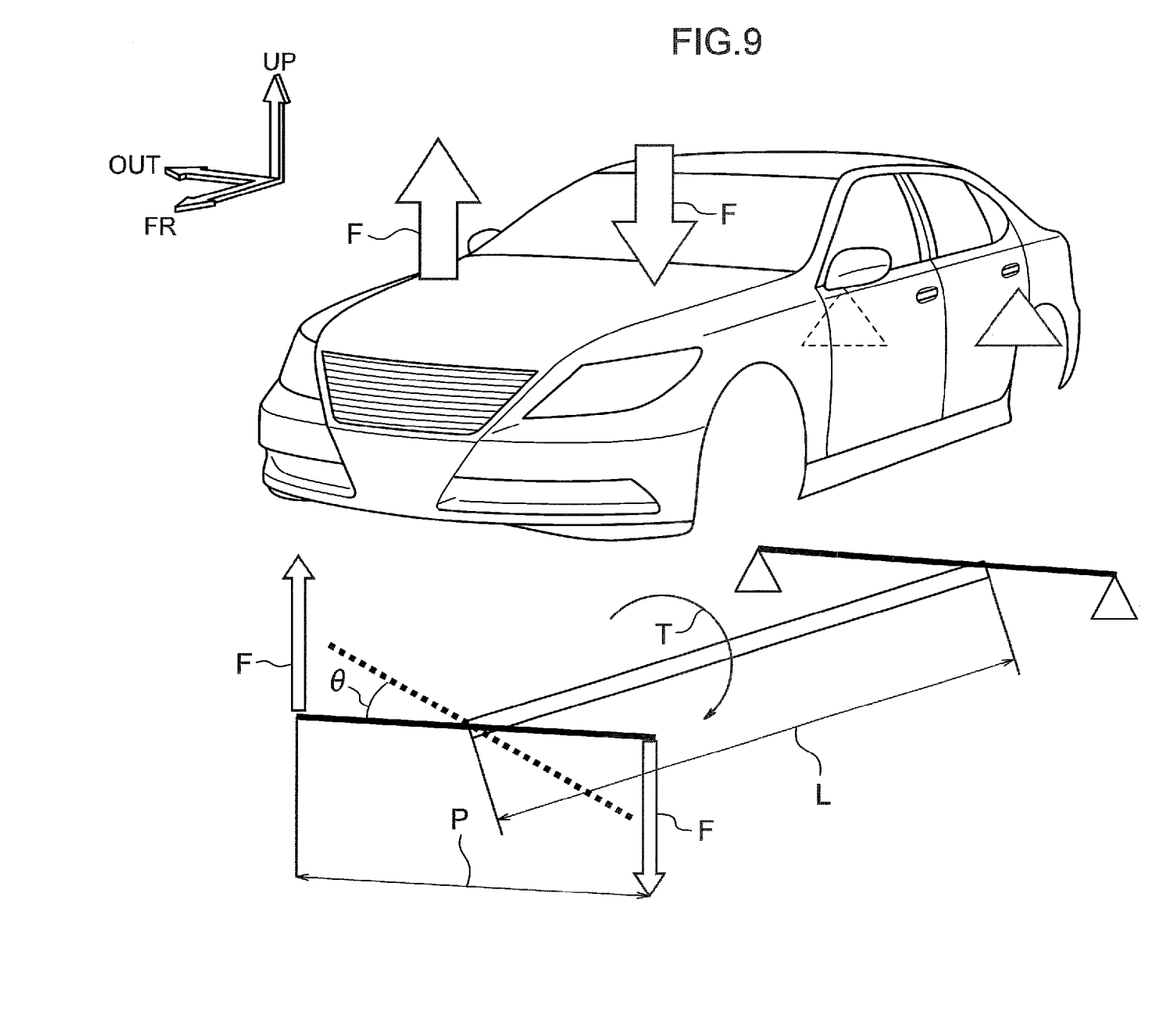
FIG. 9 is a drawing for describing a Kt value that is a value indicating the torsional rigidity of a vehicle body.

As shown in FIG. 9, the Kt value is a value given by the equation $Kt = T/\theta = F \cdot P/\theta$ when P denotes the pitch between the front suspension towers, L denotes the wheel base, T denotes the torque input to the vehicle body, and $\theta$ denotes the torsion angle from the front suspension towers to the rear suspension towers in a case where vertically reverse phase loads F have been input to the right and left front suspension towers of the vehicle body.

Furthermore, because the vehicle longitudinal dimension L1 of the end portion 14A of the front skeleton 14 is set smaller than the vehicle height dimension H1 of the end portion 14A, the space on the vehicle rear side of the end portion 14A in the trunk 52 can be enlarged. Because of this, it becomes possible to dispose the retractor 64 and the trunk hinge 62 on the vehicle rear side of the end portion 14A of the front skeleton 14 like in the present embodiment, and the degree of freedom with which these parts are disposed can be improved. Consequently, a structure that achieves a balance between ensuring the rigidity of the front skeleton 14 and the degree of freedom with which other parts are disposed can be realized.

Moreover, in the present embodiment, the vehicle height dimension H1 of the end portion 14A of the front skeleton 14 is set larger than the vehicle height direction dimension H2 of the middle portion 14B of the front skeleton 14. Deformation caused by torsion of the vehicle body is greater in the end portion 14A than in the middle portion 14B, so by configuring the end portion 14A as described above, the torsional rigidity of the vehicle body can be ensured, and at the same time the space on the lower side of the middle portion 14B can be enlarged. As a result, for example, it becomes possible to set wide the open portion 58 of the trunk pass-through, and a balance between ensuring the user-friendliness of the trunk pass-through and ensuring the rigidity of the vehicle body can be achieved.

Furthermore, the recessed portion 60 is formed on the lower side of the rear portion of the end portion 14A of the front skeleton 14, so that the lower side of the rear portion of the end portion 14A is recessed toward the vehicle front side relative to the upper side. For this reason, even in a case where the vehicle height dimension of the end portion 14A is set large, the trunk 52 can be enlarged toward the vehicle front side by an amount corresponding to the recessed portion 60. Because of this, a balance between ensuring the torsional rigidity of the vehicle body described above and effective utilization of the trunk 52 can be achieved. Moreover, the height of the upper surface of the recessed portion 60 is set higher than the height of the lower end of the retractor 64. Because of this, as shown in FIG. 10, the front end of a piece of luggage 68 stowable under the retractor 64 can be disposed further toward the vehicle front side. In FIG. 10, the position of the front end of the piece of luggage 68 in a case where the recessed portion 60 is not formed is indicated by the long dashed double-short dashed line.

Moreover, in the present embodiment, the extension portion 30A of the roof side outer member R/F 30 that is disposed inside the closed cross-sectional space of the roof side rail and reinforces the roof side rail is joined to the joined flange portion 12A of the rear wheel well 12 and the end portion 14A of the front skeleton 14. Because of this, the rigidity of the joint between the front skeleton 14 and the vehicle body side portion 11 can be further improved, so an even greater contribution can be made to improving the rigidity of the vehicle body.

Furthermore, in the present embodiment, the retractor 64 is disposed on the vehicle rear side of the front skeleton 14 and on the vehicle front side of the trunk hinge 62. For this reason, restrictions on the size of the retractor 64 can be reduced and the degree of freedom with which the vehicle rear portion including the front skeleton 14 is designed can be improved compared to a case where the retractor 64 is disposed inside the front skeleton 14.

In the first embodiment, the vehicle longitudinal dimension L2 of the middle portion 14B of the front skeleton 14 is set larger than the vehicle height dimension H2 of the middle portion 14 of the front skeleton 14, but the present invention is not limited to this. In other words, the dimension H2 may also be set larger than the dimension L2. Because of this, the aforementioned Kt value can be further improved, so the steering stability of the vehicle can be improved.

Furthermore, in the first embodiment, the vehicle height dimension H1 of the end portion 14A of the front skeleton 14 is set larger than the vehicle height dimension H2 of the middle portion 14B on the vehicle width direction center side, but the present invention is not limited to this. For example, the vehicle height dimension of the front skeleton 14 may also be set constant or substantially constant across the entire length of the front skeleton 14 in the vehicle width direction.

Furthermore, in the first embodiment, the lower side of the rear portion of the end portion 14A of the front skeleton 14 is recessed toward the vehicle front side relative to the upper side, but the present invention is not limited to this, and the recess (the recessed portion 60) may also be omitted.

Furthermore, in the first embodiment, the extension portion 30A of the roof side outer member R/F 30 serving as a reinforcement member is joined to the end portion 14A of the front skeleton 14, but the present invention is not limited to this, and the roof side outer member R/F 30 and the end portion 14A may also not be joined to one another. Furthermore, the reinforcement member is not limited to the roof side outer member R/F 30, and it suffices for the reinforcement member to be a member that is disposed inside the closed cross-sectional space 28 of the vehicle body side portion 11, reinforces the vehicle body side portion 11, and is joined to the rear wheel well 12.

Moreover, in the first embodiment, the retractor 64 is disposed on the vehicle rear side of the front skeleton 14 and on the vehicle front side of the trunk hinge 62, but the present invention is not limited to this, and the position where the retractor 64 is disposed can be appropriately changed.

Furthermore, in the first embodiment, both vehicle width direction end portions 14A of the front skeleton 14 are joined to the right and left rear wheel wells 12, but the present invention is not limited to this. In other words, one vehicle width direction end portion 14A of the front skeleton 14 may be joined to a rear wheel well 12 while the other vehicle width direction end portion 14A of the front skeleton 14 is joined to a member other than a rear wheel well 12 in the vehicle body side portion 11. In this case, for example, the configuration of a second embodiment described below can be employed as the structure for joining the other vehicle width direction end portion 14A of the front skeleton 14 to the vehicle body side portion 11.

Second Embodiment

Figure 11:
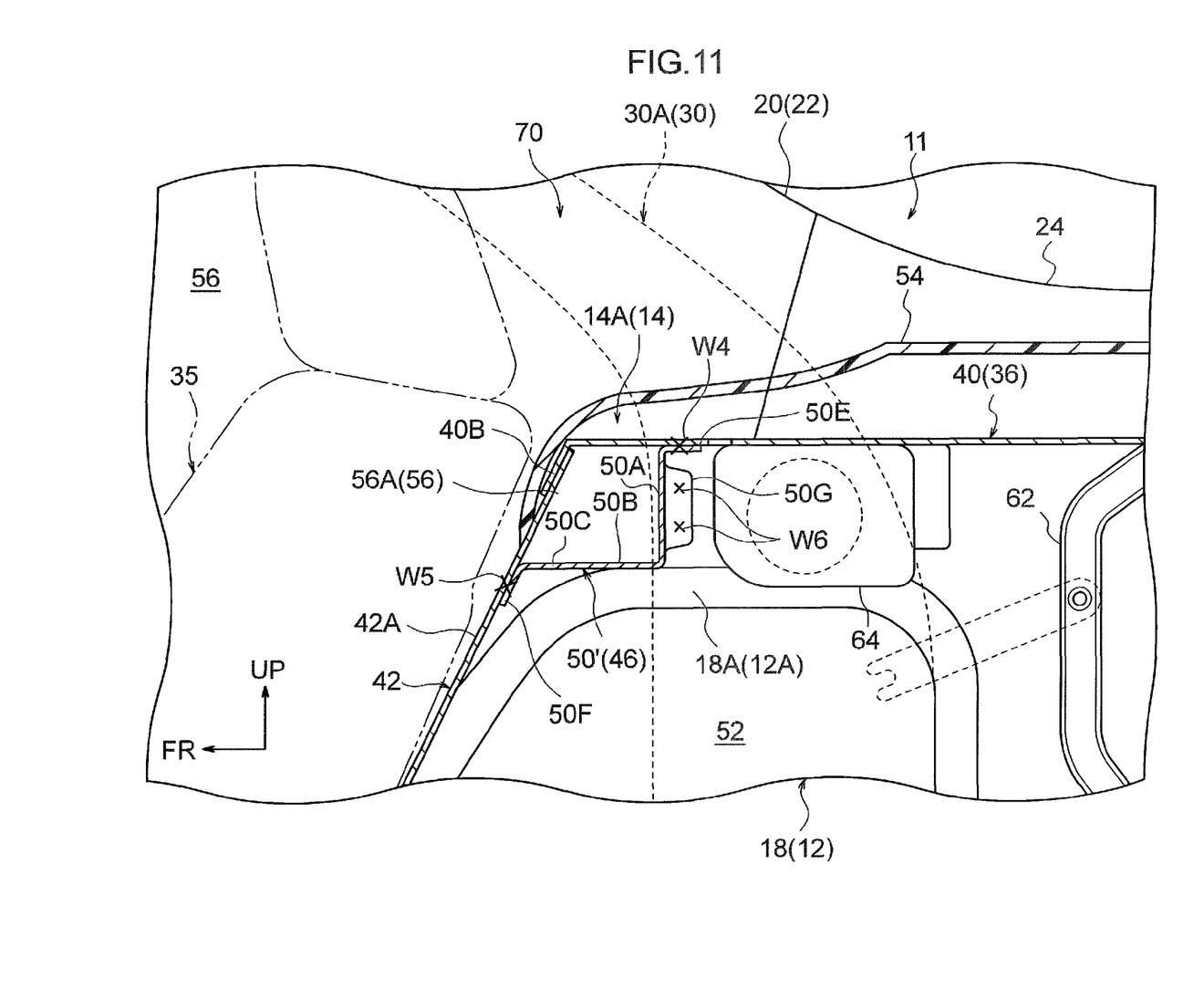
FIG. 11 is a cross-sectional view corresponding to FIG. 1 showing a partial configuration of a vehicle rear structure pertaining to a second embodiment of the present invention.

In FIG. 11, the partial configuration of a vehicle rear structure 70 pertaining to a second embodiment of the present invention is shown in a cross-sectional view corresponding to FIG. 1. Regarding configurations and action that are basically the same as those of the first embodiment, the same reference numerals as those in the first embodiment will be assigned thereto and description thereof will be omitted. In this embodiment, an R/F side portion 50' of the upper back R/F 46 is not equipped with the inclined wall 50C, so that the lower wall front portion 50D and the lower wall rear portion 50B are arranged level with one another in the vehicle longitudinal direction in the entire vehicle width direction. Furthermore, the flange portions 50H and 50J are not disposed on the R/F side portion 50', and the end portion 14A of the front skeleton 14 is not joined to the rear wheel well 12. Instead, the flange portion 50G of the R/F side portion 50' is joined by spot welding to the roof side inner member 20 and the flange portion 30A1 (see FIG. 7) of the roof side outer member R/F 30 in a three-layer overlay (see welding points W6 in FIG. 11). In other words, in the present embodiment, the end portion 14A of the front skeleton 14 is secured to the rear wheel well 12 via the roof side outer member R/F 30. In this embodiment, configurations other than those described above are the same as those of the first embodiment.

In this embodiment, the roof side outer member R/F 30 disposed inside the closed cross-sectional space 28 and the end portion 14A of the front skeleton 14 are joined to one another. The roof side outer member R/F 30 reinforces the vehicle body side portion 11 including the roof side rail and is joined to the rear wheel well 12. For this reason, because the end portion 14A of the front skeleton 14 is joined to the roof side outer member R/F 30, the rigidity of the joint between the front skeleton 14 and the vehicle body side portion 11 is better than heretofore. Because of this, like in the first embodiment, the rigidity (particularly the torsional rigidity) of the vehicle body can be ensured even in a case where a sufficient area cannot be ensured for the closed cross section of the front skeleton 14.

Moreover, the front skeleton 14 is joined to the rear wheel well 12 via (utilizing) the roof side outer member R/F 30 that reinforces the vehicle body side portion 11, so the weight and cost of the vehicle can be reduced compared to a case where a dedicated member for joining the front skeleton 14 to the rear wheel well 12 is disposed.

In the second embodiment, the end portion 14A of the front skeleton 14 is joined to the roof side outer member R/F 30 serving as a reinforcement member, but the invention is not limited to this. It suffices for the reinforcement member to which the end portion 14A of the front skeleton 14 is joined to be a member that is disposed inside the closed cross-sectional space 28 of the vehicle body side portion 11, reinforces the vehicle body side portion 11, and is joined to the rear wheel well 12.

The present invention has been described above by way of two embodiments, but the present invention can be changed and implemented in a variety of ways without departing from the spirit thereof. Furthermore, the scope of rights of the present invention is of course not limited to the embodiments.

What is claimed is:

1. A vehicle rear structure comprising:
   a rear wheel well that is disposed in a vehicle body side portion of a vehicle rear portion and is formed as a result of a wheel well outer member and a wheel well inner member being joined to one another; and
   an upper back front skeleton that extends in the vehicle width direction along a front edge of an upper back panel, has a closed cross-sectional shape as seen from the vehicle width direction, configures part of a skeleton of the vehicle body, and whose vehicle width direction end is joined to a joined portion between the wheel well outer member and the wheel well inner member.

2. The vehicle rear structure according to claim 1, wherein the vehicle height dimension of the upper back front skeleton is set larger than the vehicle longitudinal dimension of the upper back front skeleton at least at the vehicle width direction end.

3. The vehicle rear structure according to claim 1, wherein the vehicle height dimension of the upper back front skeleton is set larger at the vehicle width direction end than at a vehicle width direction center.

4. The vehicle rear structure according to claim 1, wherein the lower side of the vehicle longitudinal direction rear portion of the upper back front skeleton is recessed toward the vehicle front side relative to the upper side at least at the vehicle width direction end.

5. The vehicle rear structure according to claim 1, further comprising a reinforcement member that is disposed inside a closed cross-sectional space of a roof side rail, reinforces the roof side rail, extends toward the rear wheel well side, and is joined to the vehicle width direction end of the upper back front skeleton.

6. The vehicle rear structure according to claim 1, further comprising a seat belt take-up device that is disposed on the vehicle rear side of the upper back front skeleton and on the vehicle front side of a trunk hinge.

7. A vehicle rear structure comprising:
  a rear wheel well that is disposed in a vehicle body side portion of a vehicle rear portion;
  a reinforcement member that is disposed inside a closed cross-sectional space of the vehicle body side portion, reinforces the vehicle body side portion, and is joined to the rear wheel well; and
  an upper back front skeleton that extends in the vehicle width direction along a front edge of an upper back panel, has a closed cross-sectional shape as seen from the vehicle width direction, configures part of a skeleton of a vehicle body, and whose vehicle width direction end is joined to the reinforcement member.

\* \* \* \* \*